United States Patent Office 2,768,112
Patented Oct. 23, 1956

2,768,112

REPOSITORY VITAMIN COMPOSITIONS

Frank Harold Buckwalter, Dewitt, N. Y., assignor to Bristol Laboratories Inc., Syracuse, N. Y., a corporation of New York No Drawing. Application October 21, 1953, Serial No. 387,550

2 Claims. (Cl. 167—53.2)

This invention relates to repository or depot vitamin compositions and more particularly to repository compositions of vitamin A incorporated in an injectable oil that has been gelled by the addition of a metal salt of a fatty acid.

This application is a continuation-in-part of my prior co-pending application U. S. Serial No. 187,138, filed September 27, 1950, now abandoned, which in turn was a continuation-in-part of my prior, co-pending applications U. S. Serial No. 819, filed January 6, 1948 and U. S. Serial No. 19,497, filed April 7, 1948, now both abandoned.

A repository or depot composition, as referred to herein is a composition containing a substance which is normally capable of being parenterally injected and which, upon injection, retards or prevents for long periods the rapid absorption of the substance in the blood stream. It is essential also that all of the repository composition itself subsequently be absorbed by the body.

In the case of vitamin A and other vitamins which are rapidly absorbed from aqueous solutions into the blood stream and excreted therefrom, a method of maintaining for long periods a repository site from which the vitamin may be slowly absorbed without frequent injections is highly desirable.

The use of colloidal masses such as acacia, agar and gelatin to retard the absorption of drugs and biologically active materials has long been known. These, however, are not easily injectable and have not proved satisfactory for providing the required depot site. Another means which has been proposed for maintaining blood levels for long periods of time depends upon the establishment of an exretory blockade by the simultaneous administration of such substances as para-aminohippuric acid, caronamide and Diodrast (3,5-diiodo-4-pyridone-N-acetic acid diethanolamine).

The prolongation of activity of drugs has also been attempted by use of various slowly absorbed vehicles, such as peanut oil, to which beeswax, globin and similar materials have also been added. Such preparations possess certain disadvantages, however, vitamins are released much more rapidly than desired from a solution or suspension thereof in peanut oil. Peanut oil preparations containing globin are also unsatisfactory since the action of the drug in the blood stream is not of sufficient duration. In the case of preparations containing drugs suspended in peanut oil containing beeswax (4.8 percent or thereabout), the preparations are much more viscous than is desirable and the beeswax is an active sensitizer and may produce an allergic reaction upon injection into the body; there is also difficulty in eliminating the beeswax from the tissues after injection, although the absorption of the drug in the blood stream is retarded. Beeswax requires normally from 25 to 30 days for complete assimilation in the body. Sterile abscesses may frequently form when beeswax-containing preparations are used. Another preparation which has been proposed for the parenteral administration of drugs is a suspension of a drug in peanut oil containing pectin, but this has also failed to yield a satisfactory repository effect.

Heretofore aqueous emulsions which contain an oil such as the peanut oil and a drug emulsification being effected and stabilized by use of a soap, have been disclosed as repository or depot preparations, but these cannot be used satisfactorily with vitamins. The vitamin dissolves in the water and is thus as readily absorbed as an aqueous solution thereof, while any portion of the vitamins which remains dissolved in the oil will not be held at the point of injection any longer than a similar preparation consisting merely of an oil solution of the vitamin.

I have discovered that the absorption of vitamin A and its derivatives in the blood stream can be greatly reduced and that effect of the vitamins can be maintained for long periods by parenteral injection of a vitamin-containing composition consisting essentially of the vitamin suspended or dispersed in an oil that has been gelled with a small proportion of an aluminum stearate or an equivalent thereof. Such a composition is fluid and not unduly viscous and is readily injected through a hypodermic needle, even one of small size. I have also discovered that, whereas it has heretofore been considered necessary to use relatively large particles of the vitamin, small particles (50 microns or less) in the composition of my invention provide better repository action than larger particles, although particles up to 150 microns in size give satisfactory results.

The repository vitamin A compositions of my invention, as typified by a dispersion of vitamin A crystals in peanut oil that has been gelled by heating with a small amount of aluminum stearate, and which contain approximately 50,000 to 500,000 units of vitamin A per milliliter, are white dispersions that have the appearance of a solid viscous gel. When disturbed or shaken, however, the composition becomes much more fluid and runs as a liquid having a viscosity between about 230 and about 500 centipoises at a temperature of about 25 degrees centigrade as determined by the Stormer viscosimeter. The composition may be referred to properly as a thixotropic gel suspension and it can readily be pulled up through a needle of a hypodermic syringe and discharged therefrom with even greater facility. Although more viscous and rigid gel compositions are contemplated in the broader aspects of my invention, which compositions may not be as readily drawn up in a hypodermic syringe, these compositions are nonetheless capable of use in "one-shot" syringe equipment in which the compositions is dispensed in a compact syringe unit, since they possess even greater fluidity than comparable peanut oil-beeswax preparations and are much more readily ejected from syringes under moderate pressure.

Repository vitamin A compositions of my invention may be obtained in the form of thixotropic gels which, after shaking or stirring, flow as liquids but set again to gels on standing. The compositions are substantially anhydrous, that is, no water is added to the oil or the other constitutents during their preparation. On adding small amounts of water to the compositions, the gel thickens and loses some of its thixotropic properties; further amounts of water produce a separation of the compositions into an aqueous phase and a viscous oily or waxy solid. Accordingly, it is advisable in using the compositions to keep them dry, as in stoppered vials, and to avoid adding water to them or bringing them into contact with water, as in water-washed but undried syringes, although substantial proportions of water are normally necessary to affect the composition greatly and render it unusable or difficult to dispense.

The gel or vehicle portion of the repository composition of my invention is produced from peanut oil or an ester of a fatty acid having 12 or more carbon atoms per molecule. Ethyl oleate is eminently suitable, as are esters of alcohols such as methyl, ethyl, propyl, butyl, glycol and glycerol with long-chained saturated and unsaturated monocarboxylic acids having from 12 to 22 carbon atoms, inclusive. Esters of hydroxy-substituted acids of this group, for example, castor oil, are less suitable than the simple unsubstituted acids. The preferred esters are the fatty oils which are readily saponifiable and which are non-drying; such preferred oils are peanut, sesame, soy bean, cottonseed, and corn. Other saponifiable esters, not included in this group but which are also suitable, are isoamyl salicylate, dibutyl sebacate and ethyl-alpha-phenylbutyrate. The preferred esters are normally liquid, hence beeswax, which is predominantly myricyl palmitate (myricin), the palmitic acid of myricle alcohol ($C_{30}H_{61}OH$), is not a suitable ester. The esters specified herein include the normal dodecanoic (lauric), tridecanoic, tetradecanoic (myristic), pentadecanoic, hexadecanoic (palmitic), heptadecanoic (margaric), octadecanoic (stearic), nonadecanoic, eicosanoic (arachidic), heneicosanoic, and docosanoic (behenic) acids, as well as their branched-chain isomers and corresponding unsaturated acids, including palmitoleic, oleic, ricinoleic, petroselinic, vaccenic, linoleic, linolenic, eleostearic, licanic, parinaric, gadoleic, arachidonic, cetoleic and erusic acids. Mixtures of esters, such as occur in natural oils and fats, are included within the scope of this invention.

Peanut oil or other suitable ester, as referred to herein, is transformed to a gel before being incorporated into the compositions of the invention. This gelling is effected by treatment of the oil with a small proportion of a salt or soap of aluminum and a fatty acid, for example, an aluminum stearate. Commercial grades of aluminum stearate are suitable and their designations as aluminum monostearate, aluminum distearate and aluminum tristearate, relate more particularly to their content of aluminum rather than to their actual compositions. All three of the purest aluminum stearates referred to are soaps and are generally non-crystalline and probably have similar or identical components which generally conform to the general theoretical formula

$$Al(OH)_n(C_{17}H_{35}COO)_{3-n}.$$

For the purpose of my invention I have found that the products designated as aluminum monostearate and aluminum distearate are very similar in properties and are preferable to aluminum tristearate, although the tristearate is usable for the purpose of my invention. The preparation of these aluminum soaps of fatty acids has heretofore been described and they are well-known articles of commerce.

In place of aluminum salts of fatty acids, I may use for gelling the ester of a fatty acid salt of germanium or zirconium; however, corresponding calcium, barium, magnesium, zinc, strontium, sodium and potassium salts or soaps do not produce satisfactory gelation or compositions which possess the desired repository effect.

The preferred salts for the gellification of the ester are aluminum salts of fatty acids and I prefer to use aluminum salts of the same or similar fatty acids as those of the ester. Thus, in gellifying the glycerol ester of lauric acid I prefer to use aluminum laurate instead of aluminum stearate, although eminently satisfactory compositions are produced when aluminum stearate is used for gelling peanut oil. It is not necessary that the acid of the aluminum salt have 12 or more carbon atoms, since there may be acid interchange with the oil and the result will not be substantially different from that obtained by the use of specified salts.

The function of the various components of my repository composition are not understood clearly and the theory of repository action is complicated further by the fact that so many varied and unrelated substances have exhibited some degree of repository action. From the very nature and behavior of my compositions in comparison with compositions made from peanut oil and beeswax, I believe different actions to be involved in the respective cases. The appearance and characteristics of a composition reveal little with respect to its action or the transformations it undergoes after injection. Nonetheless, for lack of better knowledge I believe the unique properties of the compositions of my invention to be attributable to the gel character of the vehicle. The gel may have a latticework structure in which the metal or metal soap molecules are at various corners of cubes or other patterns formed by the ester or oil molecules and this latticework structure controls the release of the penicillin or other drug molecule from the gel. It is for this reason that I prefer to use as gelling agents a metal salt of the same or a similar fatty acid as that of the oil or ester. Aluminum 2-ethylhexoate, for example, is a good gelling agent for ethyl-alpha-phenylbutyrate and I have prepared satisfactory compositions from such gels in accordance with my invention.

The amount of aluminum monostearate or other gelling agent which is used in accordance with my invention is generally within the range of approximately 1 to approximately 10 percent, and preferably within the range of 1 to 3 percent of the oil or ester. These percentages, as well as all other percentages with reference to this particular phase of my invention, represent parts by weight of the gelling agent to parts by volume of the oil or ester; these percentages are abbreviated in some instances herein to the conventional symbol "percent(w./v.)" or "%(w./v.)." A gel formed by gelling peanut oil with 2 percent (w./v.) of aluminum stearate is a preferred material for the preparation of composition of this invention. The effect of varying the proportions of these gelling agents on the characteristics of the repository compositions is shown in results listed hereinafter. It is desirable to use as little of the metal salt or soap as possible for the gelling of the ester since such materials may slow down the subsequent absorption of the composition in the body after all the agent has been absorbed.

To gel the oil or ester, the oil is heated with the gelling agent, preferably with stirring, to a suitable temperature, which may vary somewhat with different esters and proportions of materials but which will generally be below 150 degrees centigrade. Peanut oil, for example, can be readily gelled by heating it with 2 percent (w./v.) of aluminum monostearate to approximately 118 to 135 degrees centigrade, at which point the suspension or dispersion becomes clear. To prevent fusion or agglomeration of the aluminum stearate particles, the aluminum stearate is added below a temperature of approximately 80 degrees centigrade and preferably at the start at room temperature, and the entire batch is kept well stirred during the heating, which may be at the rate of approximately 2 to 3 degrees per minute. There is no great danger in overheating, provided decomposition of the oil is not engendered; the characteristics of the gel are not substantially affected by heating for longer periods or to higher temperatures. Other methods are known for effecting gelling but none appears to be as effective and as easily performed and controlled as this simple heating step.

After the ester has been gelled, it is cooled, the vitamin A thereof is added thereto in powdered form and incorporated therewith by stirring.

Examples of the products of my invention and methods for their preparation are described hereinafter.

Example 1

To 100 cc. of peanut oil is added 2% (w./v.) of powdered commercial aluminum monostearate and the mixture agitated for 15 minutes with the temperature less than 100° F. The mixture is then agitated and heated until the temperature is 135° C. The heating is conducted at the rate of 2 to 3 degrees centigrade per minute. The mixture will clear and the gel will form at about 118°–120° C. When the temperature reaches 135° C., heating is discontinued and the mixture agitated until the temperature is 120° C. At this point agitation is stopped and the gel is allowed to cool to room temperature.

To 10 cc. of the above gel were added 10 cc. of high potency fish liver oil (containing 323,000 I. U. Vitamin A per gram). The mixture is agitated, milled for 5 minutes at #10 setting in an Eppenbach colloid mill and remixed for 15 minutes at room temperature with a laboratory stirrer. This products contains per cc. of gel 161,500 I. U. Vitamin A.

*Example II*

To 100 cc. of peanut oil is added 3% (w./v.) of powdered commercial aluminum distearate and the mixture agitated for 15 minutes with the temperature less than 100° F. The mixture is then agitated and heated until the temperature is 135° C. The heating is conducted at the rate of 2 to 3 degrees centigrade per minute. The mixture will clear and the gel will form at about 118°–120° C. When the temperature reaches 135° C., heating is discontinued and the mixture agitated until the temperature is 120° C. At this point, agitation is stopped and the gel is allowed to cool to room temperature.

In 20 cc. of the above gel were dispersed 2,000,000 units of synthetic vitamin A. The mixture is agitated, milled for 5 minutes at #10 setting in an Eppenbach colloid mill and remixed for 15 minutes at room temperature with a laboratory stirrer. This product contains 100,000 units of vitamin A per cc. of gel.

*Example III*

To 100 cc. of peanut oil is added 4% (w./v.) of powdered commercial aluminum monostearate and the mixture agitated for 15 minutes with the temperature less than 100° F. The mixture is then agitated and heated until the temperature is 135° C. The heating is conducted at the rate of 2 to 3 degrees centigrade per minute. The mixture will clear and the gel will form at about 118°–120° C. When the temperature reaches 135° C., heating is discontinued and the mixtures agitated until the temperature is 120° C. At this point, agitation is stopped and the gel is allowed to cool to room temperature.

In 20 cc. of the above gel were dispersed 6,000,000 units of synthetic vitamin A. The mixture is agitated, milled for 5 minutes at #10 setting in an Eppenbach colloid mill and remixed for 15 minutes at room temperature with a laboratory stirrer. This product contains 300,000 units of vitamin A per cc. of gel.

*Example IV*

To 100 cc. of peanut oil is added 4% (w./v.) of powdered commercial aluminum monostearate and the mixture agitated for 15 minutes with the temperature less than 100° F. The mixture is then agitated and heated until the temperature is 135° C. The heating is conducted at the rate of 2 to 3 degrees centigrade per minute. The mixture will clear and the gel will form at about 118°–120° C. When the temperature reaches 135° C., heating is discontinued and the mixture agitated until the temperature is 120° C. At this point agitation is stopped and the gel is allowed to cool to room temperature.

In 20 cc. of the above gel were dispersed 10,000,000 units of synthetic vitamin A. The mixture is agitated, milled for 5 minutes at #10 setting in an Eppenbach colloid mill and remixed for 15 minutes at room temperature with a laboratory stirrer. This product contains 500,000 units of vitamin A per cc. of gel.

It is customary to administer vitamin A by the oral route. Experiments carried out suggested that per os administration resulted in appreciable loss of the vitamin A and that a more certain method of administration would be desirable.

The most convenient alternate route for vitamin A appeared to be the intramuscular one. This route appeared suitable despite the possibility that absorption might be too rapid and as a result appreciable losses might occur due to this rapid absorption.

Two Ayrshire bull calves were available for this experiment. Calf No. 1 was given one ml. of a high potency fish liver oil containing 323,000 I. U. vitamin A per gram. Calf No. 2 was injected with one ml. of the same vitamin A oil mixed with an equal volume of peanut oil gelled with aluminum monostearate. In both animals the injection was made into the "biceps femoris" and "rectus femoris." No swelling or exudate was in evidence after injection. Table I gives the blood plasma concentrations found for vitamin A at various periods post injection.

TABLE I

*Blood plasma levels of vitamin A following intramuscular administration of vitamin A in fish oil and in fish oil diluted with aluminum monostearate-peanut oil gel.*

| Time in hours Post Injection | Vitamin A I.U./100 cc. | |
| --- | --- | --- |
| | Calf #1 | Calf #2 |
| 0 | 56 | 40 |
| 1 | 54 | 33 |
| 4 | 141 | 83 |
| 7 | 162 | 139 |
| 11 | 139 | 40 |
| 24 | 111 | 129 |
| 31 | 88 | 107 |
| 48 | 57 | 95 |
| 72 | | 36 |

Two points are evident from this experiment. The first, that intramuscular administration of vitamin A permits the establishment of high plasma levels of this vitamin which are maintained for a period of about 24 hours. The second, that the aluminum monostearate in peanut oil does delay the absorption of intramuscularly administered vitamin A as evidenced by the maintenance of blood plasma levels for prolonged periods.

Inasmuch as the foregoing specification comprises preferred embodiments of the invention, it is understood that variations and modifications may be made herein in accordance with the principles disclosed, without departing from the scope of the invention, which is limited solely by the appended claims.

I claim:

1. A substantially anhydrous fluid bovine preparation comprising vitamin A dispersed in a vehicle comprising an injectable oil having dispersed therein a quantity of an aluminum stearate sufficient to maintain prolonged presence in the blood stream of said vitamin upon injection of said preparation compared with the duration of presence in the blood stream obtained upon injection of a similar preparation containing no stearate and characterized in that said injectable oil is a nondrying saponifiable oil which is normally liquid and the quantity of an aluminum stearate dispersed in said injectable oil is within the range of from approximately 0.1 to approximately 10% based upon parts by weight of said stearate to parts by volume of said oil.

2. A substantially anhydrous fluid bovine preparation comprising vitamin A dispersed in a vehicle comprising an injectable oil having dispersed therein a quantity of an aluminum stearate sufficient to maintain prolonged presence in the blood stream of said vitamin upon injection of said preparation compared with the duration of presence in the blood stream obtained upon injection of a similar preparation containing no stearate and characterized in that said injectable oil is a nondrying saponifiable oil which is normally liquid and the quantity of an aluminum stearate dispersed in said injectable oil is within the range of from 1 to 4% based upon parts by weight of said stearate to parts by volume of said oil.

References Cited in the file of this patent

UNITED STATES PATENTS

| | | |
|---|---|---|
| 1,638,700 | Molofsky | Aug. 9, 1927 |
| 2,327,564 | Scherer | Aug. 24, 1943 |
| 2,507,193 | Buckwalter | May 9, 1950 |

OTHER REFERENCES

Fischer: Ohio State Medical Journal, August 1942, page 756.

Bennett: Cosmetic Formulary (1937), page 71.